(12) United States Patent
Kato et al.

(10) Patent No.: US 8,071,169 B2
(45) Date of Patent: Dec. 6, 2011

(54) DROPLET DISCHARGE METHOD, ELECTRO-OPTICAL DEVICE, AND ELECTRONIC DEVICE

(75) Inventors: Tsuyoshi Kato, Shiojiri (JP); Kazumi Aruga, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 778 days.

(21) Appl. No.: 11/451,565

(22) Filed: Jun. 13, 2006

(65) Prior Publication Data
US 2007/0003689 A1    Jan. 4, 2007

(30) Foreign Application Priority Data

Jun. 30, 2005  (JP) .................................. 2005-191126
Apr. 3, 2006   (JP) .................................. 2006-101643

(51) Int. Cl.
*B05D 5/00* (2006.01)

(52) U.S. Cl. .............................. 427/256; 347/37; 347/44

(58) Field of Classification Search ........................ None
See application file for complete search history.

(56) References Cited

U.S. PATENT DOCUMENTS

| | | | |
|---|---|---|---|
| 4,380,017 A * | 4/1983 | Ort | 347/39 |
| 5,422,666 A * | 6/1995 | Koyama | 347/41 |
| 5,670,205 A * | 9/1997 | Miyazaki et al. | 427/64 |
| 6,293,643 B1 * | 9/2001 | Shimada et al. | 347/15 |
| 6,464,330 B1 * | 10/2002 | Miller et al. | 347/40 |
| 6,660,332 B2 | 12/2003 | Kawase et al. | |
| 7,222,927 B2 | 5/2007 | Eguchi et al. | |
| 7,300,127 B2 * | 11/2007 | Konno | 347/13 |

FOREIGN PATENT DOCUMENTS

| | | |
|---|---|---|
| CN | 1358626 A | 7/2002 |
| JP | 09-281324 A | 10/1997 |
| JP | 10-151755 A | 6/1998 |
| JP | 2000-185403 A | 7/2000 |
| JP | 2001-188117 A | 7/2001 |
| JP | 2004-188830 A | 7/2004 |
| JP | 2004-267927 A | 9/2004 |
| JP | 2004-358299 A | 12/2004 |

* cited by examiner

*Primary Examiner* — Frederick Parker
*Assistant Examiner* — Alex Rolland
(74) *Attorney, Agent, or Firm* — Global IP Counselors, LLP

(57) ABSTRACT

A droplet discharge method includes performing a plurality of scans in which a discharge head and a substrate are scanned relative to each other, discharging droplets of a plurality of types of functional liquid from the discharge head onto a plurality of prescribed portions on the substrate that are arranged in a matrix while the discharge head and the substrate are scanned. The discharging of the droplets includes discharging the droplets onto the prescribed portions over the plurality of scans so that centers of newly discharged droplets are made to land at one of positions that overlap with centers of landing positions of the droplets already discharged to the prescribed portions and positions that are offset in a row direction and in a column direction of the matrix from the centers of the landing positions of the droplets already discharged to the prescribed portions.

2 Claims, 16 Drawing Sheets

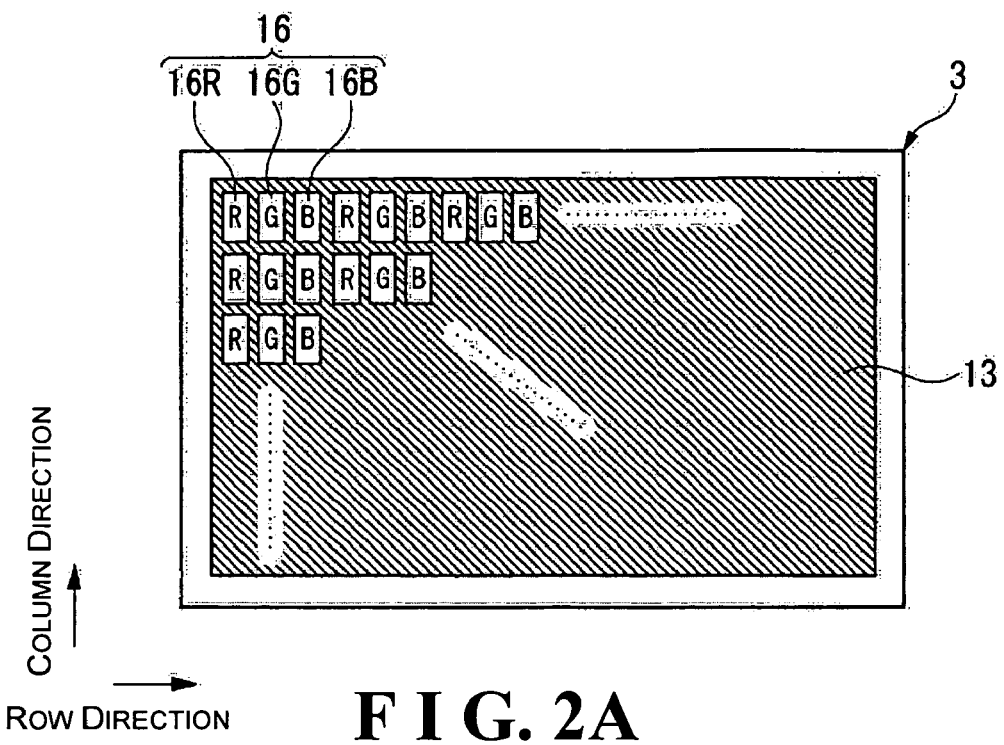
F I G. 2A
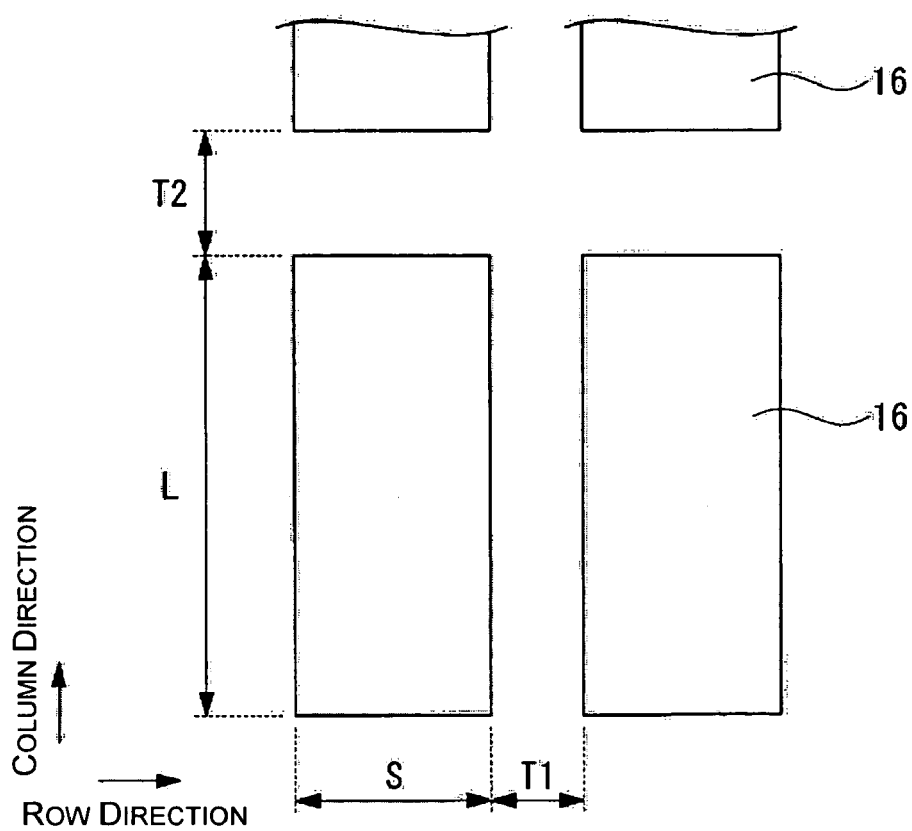
F I G. 2B

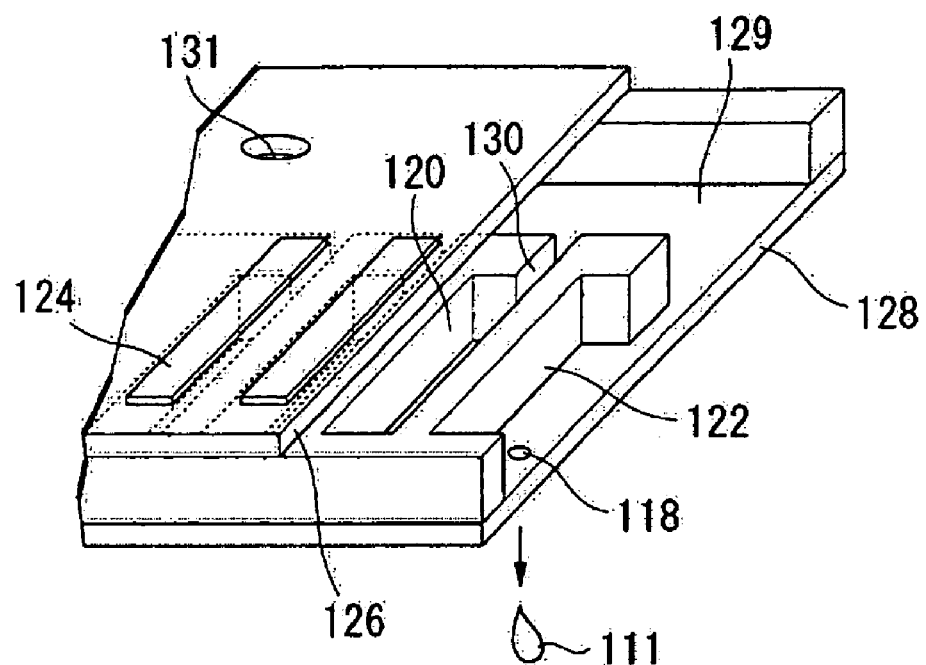
F I G. 6A
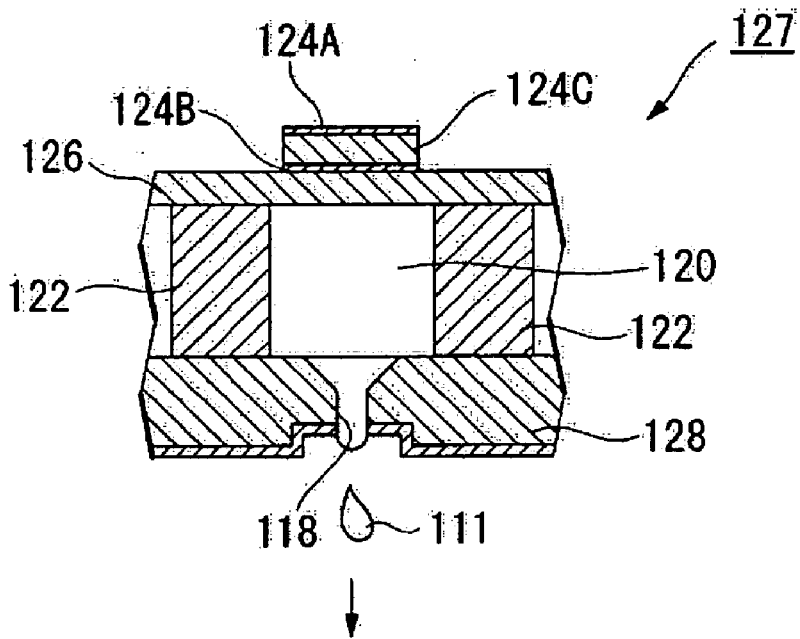
F I G. 6B

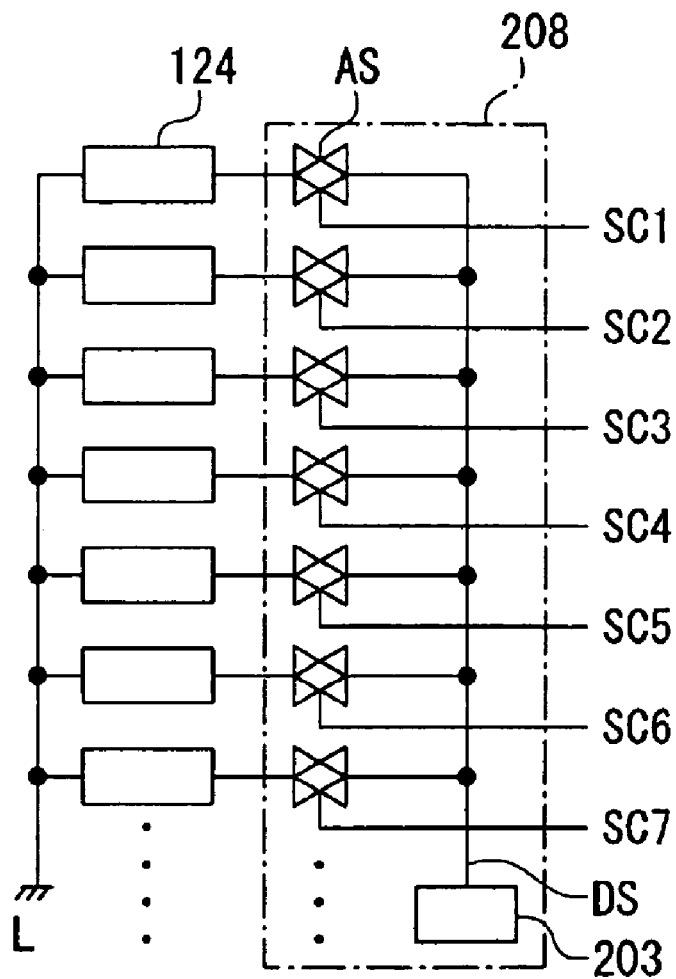
F I G. 8A
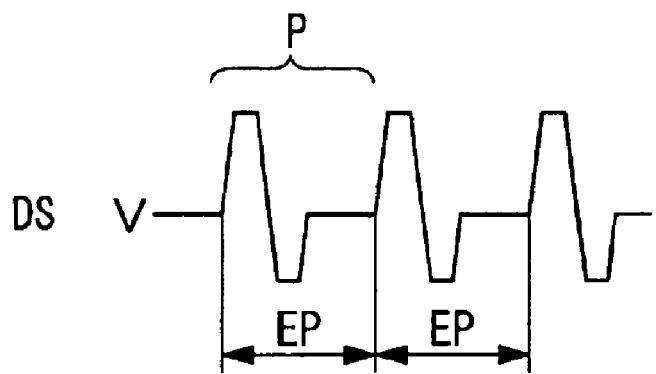
F I G. 8B

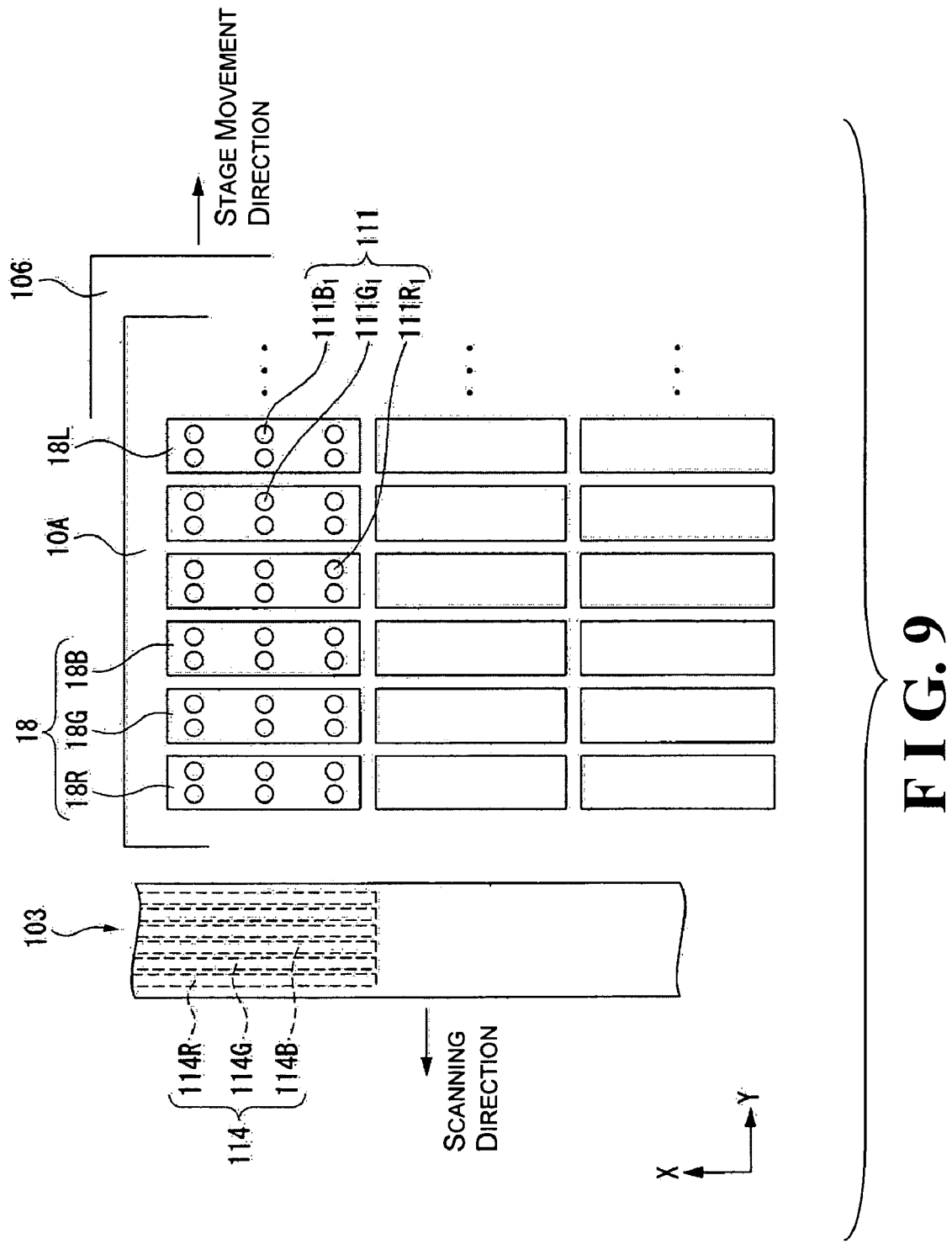

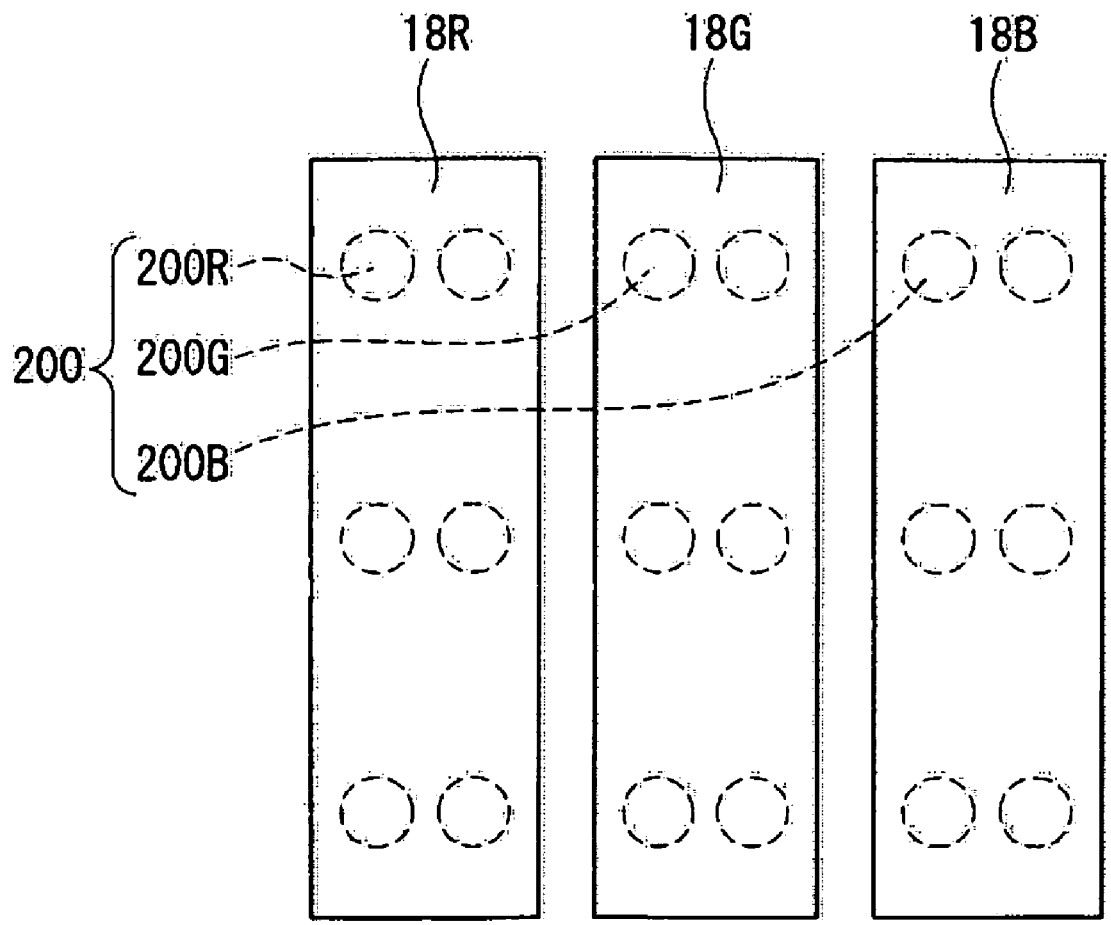
F I G. 11

DROPLET DISCHARGE METHOD, ELECTRO-OPTICAL DEVICE, AND ELECTRONIC DEVICE

CROSS-REFERENCE TO RELATED APPLICATIONS

This application claims priority to Japanese Patent Application Nos. 2005-191126 and 2006-101643. The entire disclosures of Japanese Patent Application Nos. 2005-191126 and 2006-101643 are hereby incorporated herein by reference.

BACKGROUND

1. Technical Field

The present invention relates to a droplet discharge method, an electro-optical device, and an electronic device.

2. Related Art

The droplet discharge head of an inkjet printer is able to discharge microscopic ink droplets in the form of dots, which affords extremely high precision in terms of the uniformity of the size and pitch of the ink droplets. This technology has been applied to the manufacture of many different products, such as electro-optical devices. For instance, it can be applied in the formation of a film for the light-emitting components of organic EL display devices or the color filter layers of liquid crystal devices.

More specifically, a droplet discharge head is filled with a special ink, a photosensitive resin liquid, or another such functional liquid, and droplets of this functional liquid are discharged onto prescribed portions provided on a substrate. The Japanese Laid-Open Patent Publication No. 2004-267927 is an example of related art. A number of different colors are usually formed in the light-emitting components or color filters used in modern electro-optical devices, and a plurality of types of functional liquid are discharged onto the substrate, each by a different device, one at a time.

When the apparatus discussed in the above mentioned reference is used, however, since a plurality of types of functional liquid are discharged onto the substrate by different devices one at a time, the overall discharge ends up taking a long time. In view of this, the idea was conceived to discharge all types of functional liquid with a single device in order to shorten the discharge time.

Also, the prescribed portions disposed on the substrate usually have a larger volume than the droplets of functional liquid, and cannot be fully filled with functional liquid in a single scan, so scanning is performed a number of times. A known method employed in these multiple scans is to have newly arriving droplets land in regions in between the droplets of functional liquid that have landed on the prescribed portions, and thereby cover up the bottom surface of the prescribed portions.

However, precise control is necessary to adjust the landing positions in order to have the newly arriving droplets land accurately in between the droplets of functional liquid as discussed above, and in actual practice this is exceedingly difficult. Also, when the above method is employed, the landing position is limited to just a small portion of the discharge region, and the landed droplets do not spread out sufficiently, so the droplets end up being disposed unevenly. When this happens, the film of functional liquid that is formed is not uniform, and this leads to inconsistent display in an electro-optical device, for example.

In view of the above, it will be apparent to those skilled in the art from this disclosure that there exists a need for an improved droplet discharge method, an improved electro-optical device, and an improved electronic device. This invention addresses this need in the art as well as other needs, which will become apparent to those skilled in the art from this disclosure.

SUMMARY

It is an advantage of the present invention to provide a droplet discharge method, an electro-optical device, and an electronic device, with which the landing position of a functional liquid can be easily adjusted, and the formation of a non-uniform functional liquid film can be prevented.

To achieve the stated object, the droplet discharge method in accordance with a first aspect of the present invention is a droplet discharge method in which a discharge head and a substrate are scanned relative to each other while droplets of a functional liquid are discharged onto a plurality of prescribed portions of the substrate, wherein the prescribed portions are arranged in a matrix on the substrate, and when droplets of the functional liquid are discharged to the prescribed portions by a plurality of scans, in each scan, centers of newly discharged droplets are made to land at one of positions that overlap with centers of landing positions of the droplets already discharged to the prescribed portions and positions that are offset in the row direction and column direction of the matrix from the centers of the landing positions of the droplets already discharged to the prescribed portions.

With this arrangement, if the prescribed portions are arranged in a matrix, then when droplets of functional liquid are discharged a plurality of time to the prescribed portions, centers of newly discharged droplets are made to land at one of positions that overlap with centers of landing positions of the droplets already discharged to the prescribed portions and positions that are offset in the row direction and in the column direction of the matrix from the centers of the landing positions of the droplets already discharged to the prescribed portions. Thus, there is no need for precise control of the landing of the functional liquid droplets so as to fill in between the landing positions, it is very easy to adjust the position where the droplets of functional liquid will land, and the formation of a non-uniform film of functional liquid can be prevented.

It is preferable if the newly discharged droplets are made to land at positions overlapping in a plan view with the landing positions of the droplets already discharged.

With this arrangement, newly discharged droplets are made to land at positions overlapping in a plan view with the landing positions of the droplets already discharged, and may be made to land in the same position in every discharge, so it is easier to adjust the landing position of the droplets. Also, with this arrangement, the landing position is limited, but the droplets that have already landed spread out within the prescribed portions due to the impact of the newly landing droplets, which prevents a non-uniform functional liquid film from being formed.

Also, it is preferable if droplets of the functional liquid are discharged so that a plurality of landing positions are disposed in at least one of the row direction and the column direction of the matrix in each of the discharges produced by a plurality of scans, and the newly discharged droplets are made to land at positions offset from a straight line connecting the centers of a plurality of landing positions.

With this arrangement, since droplets of the functional liquid are discharged so that landing positions are adjacent to at least one of the row direction and the column direction of the matrix in each of a plurality of discharges, and the droplets are newly landed at positions offset from a straight line connecting the centers of these landing positions, it is possible to land the droplets over the entire prescribed portions. This allows the functional liquid to be formed in a flat layer in the prescribed portions.

The electro-optical device in accordance with another aspect of the present invention includes a substrate on which a functional liquid has been discharged by the above-mentioned droplet discharge method.

With this arrangement, droplets of functional liquid are discharged by a droplet discharge method with which the position where the functional liquid lands can be easily adjusted, and the formation of an uneven film of functional liquid can be prevented, so an electro-optical device with no display unevenness can be obtained.

The electronic device in accordance with another aspect of the present invention includes the above-mentioned electro-optical device. With this arrangement, since the electro-optical device with no display unevenness is installed, an electronic device with superior display performance can be obtained.

Also, in accordance with another aspect of the present invention, a droplet discharge apparatus is configured and arranged to discharges droplets of a functional liquid onto a plurality of prescribed portions of a substrate while the substrate and a discharge head are scanned relative to each other, wherein said droplet discharge apparatus has a processing section configured to control the discharge operation of the droplets of functional liquid onto the prescribed portions, which are arranged in a matrix on the substrate. The processing section controls the discharge of droplets to be newly landed, so that when droplets of the functional liquid are discharged to the prescribed portions by a plurality of scans, in each scan, the discharge droplets to be newly landed is controlled so as to avoid regions extending linearly in the row direction and column direction of the matrix from the landing positions of the droplets already discharged to the prescribed portions.

With this arrangement, when droplets of the functional liquid are discharged to the prescribed portions, which are arranged in the matrix, by a plurality of scans, the discharge of droplets to be newly landed is controlled so as to avoid regions extending linearly in the row direction and in the column direction of the matrix from the landing positions of the droplets already discharged to the prescribed portions, and therefore unevenness and so forth produced by droplets landing in a matrix form can be reduced by changing the position in a plurality of scans in the prescribed portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2A is a plan view of a color filter substrate in accordance with the first embodiment of the present invention;

FIG. 2B is an enlarged partial plan view of the color filter substrate in accordance with the first embodiment of the present invention;

FIG. 6A is a partial perspective view illustrating an internal structure of the head of the droplet discharge apparatus in accordance with the first embodiment of the present invention;

FIG. 6B is a partial cross sectional view of the head of the droplet discharge apparatus in accordance with the first embodiment of the present invention;

FIG. 8A is a diagram of a head driver of the droplet discharge apparatus in accordance with the first embodiment of the present invention;

FIG. 8B is a diagram illustrating a drive signal issued by the head driver in accordance with the first embodiment of the present invention;

FIG. 9 is a diagram of a head layout in the droplet discharge apparatus in accordance with the first embodiment of the present invention;

FIG. 11 is a partial enlarged view of the color filter substrate illustrating prescribed portions of the color filter substrate after a scan is performed in accordance with the first embodiment of the present invention;

DESCRIPTION OF EXEMPLARY EMBODIMENTS

Figure 1:
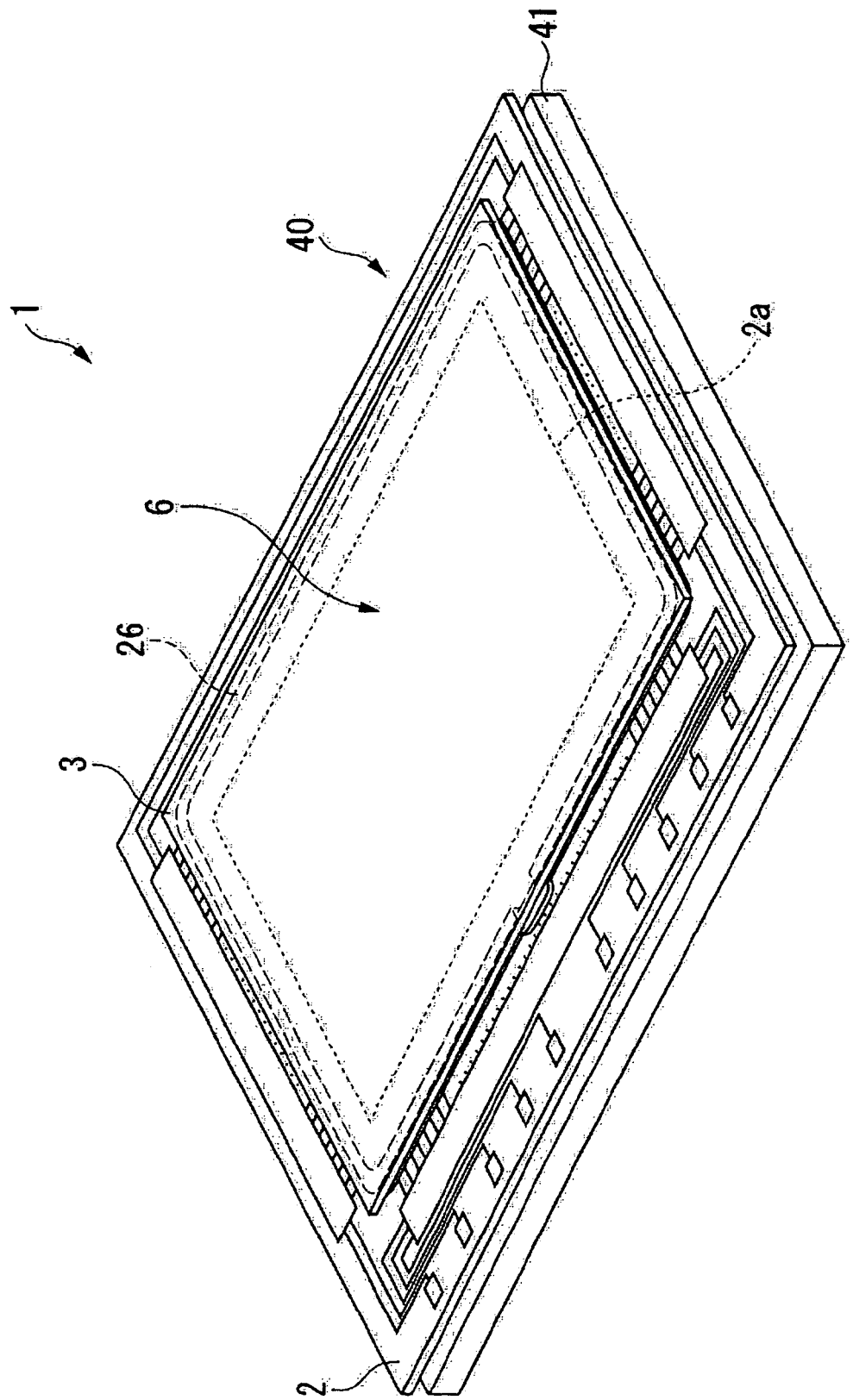
FIG. 1 is a perspective view of a liquid crystal device in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A first embodiment of the present invention will now be described through reference to the drawings. In the drawings, the scale is varied as necessary to show each of the members large enough to be recognized.

Electro-Optical Device

FIG. 1 is a perspective view of the structure of a liquid crystal device 1 in accordance with this embodiment. As shown in FIG. 1, the liquid crystal device 1 includes a liquid crystal panel 40 and a backlight 41. The liquid crystal panel 40 comprises an active matrix substrate 2 and a color filter substrate 3 that are stuck together with a sealing material 26 in between, and liquid crystals are sandwiched between the active matrix substrate 2, the color filter substrate 3, and the sealing material 26. A display area 2a indicated by the dashed line in FIG. 1 is the area where still or moving images or the like are displayed.

The liquid crystal device 1 in this embodiment is an active matrix type of liquid crystal device which makes use of a thin film diode (TFD), which is a two-terminal type of nonlinear element, as a switching element. Of course, the liquid crystal device 1 may instead, for example, be a liquid crystal device that makes use of a thin film transistor (TFT) as a switching element, or a passive matrix type of liquid crystal device. The liquid crystal panel 40 is formed by putting together two large motherboards and cutting (dicing). The two motherboards are a color filter-side motherboard on which the color filter substrate 3 is produced, and an active matrix-side motherboard on which the active matrix substrate 2 is produced.

FIG. 2A is a plan view of the structure of the color filter substrate 3. FIG. 2A is a diagram of the overall structure of the color filter substrate 3, while FIG. 2B is a detail view of part of the color filter substrate 3.

As shown in FIG. 2A, the color filter substrate 3 is a rectangular substrate formed from a transparent material such as glass or plastic. A light blocking layer 13 is provided over the color filter substrate 3, and a color filter 16 having a red layer 16R, a green layer 16G, and a blue layer 16B, which are pixels corresponding to the regions surrounded by the light blocking layer 13 (pixel regions), is provided in the form of a matrix. In this embodiment, the red layer 16R, green layer 16G, and blue layer 16B of the color filter 16 are formed by inkjet method, and the liquid material is discharged in the pixel regions from a droplet discharge apparatus (discussed below), so in the following description these pixel regions will be called "prescribed portions."

Also, an overcoat layer (not shown) is formed on the color filter substrate 3 so as to cover the color filter 16 in the regions surrounded by the light blocking layer 13, and an oriented film (not shown) is formed on the overcoat layer. This oriented film is a horizontally oriented film composed of polyimide, for example, whose surface has been lapped.

As shown in FIG. 2B, each one of the red layers 16R (or the green layers 16G or the blue layers 16B) is provided in rectangular form such that the length S of the short side is about 170 µm, for example, and the length L of the long side is about 510 µm, for example. As to the spacing between adjacent color filters 16, the spacing T1 in the row direction is approximately 20 µm, while the spacing T2 in the column direction is approximately 40 µm.

Droplet Discharge Apparatus

Figure 3:
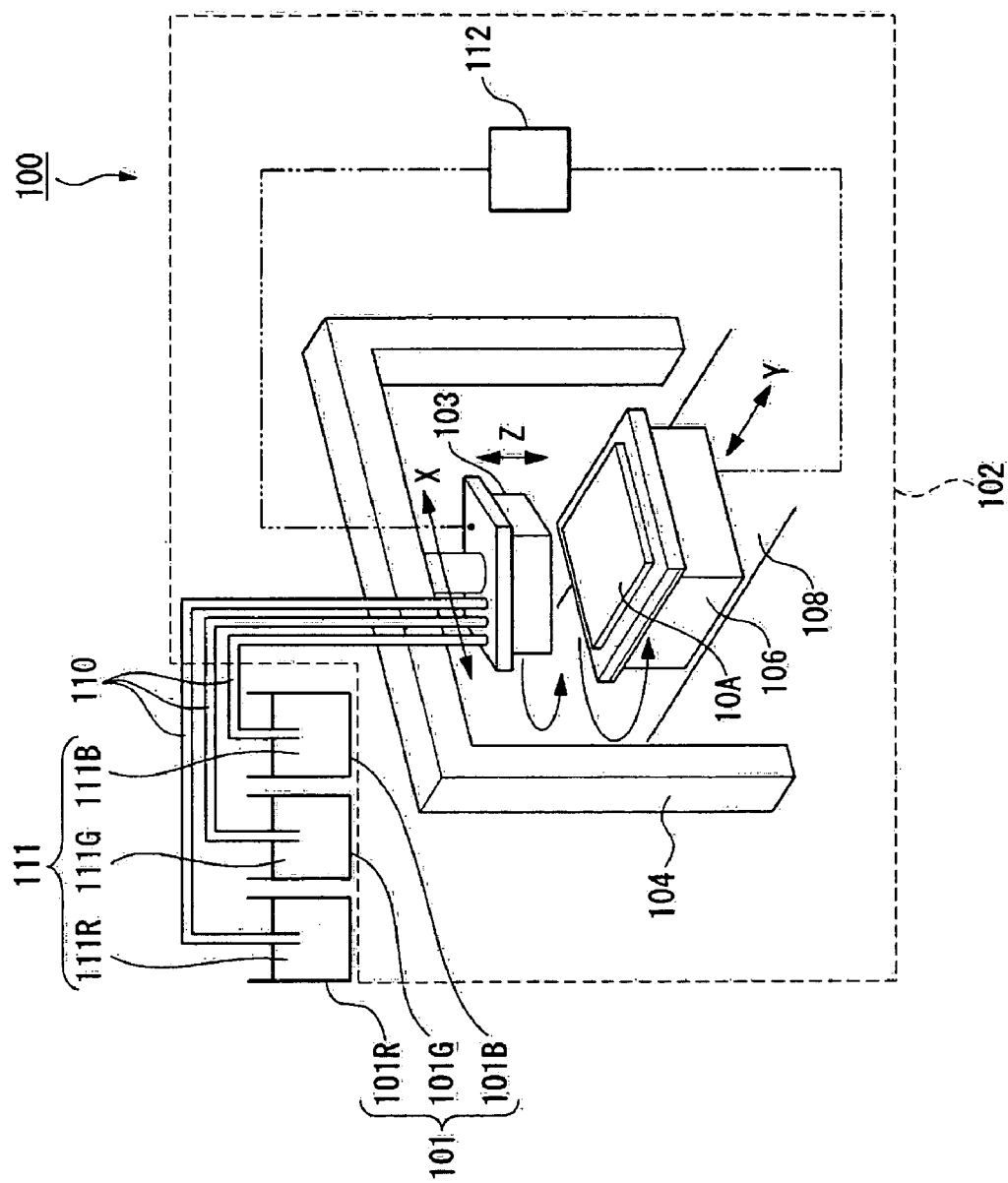
FIG. 3 is a perspective view of an overall structure of a droplet discharge apparatus in accordance with the first embodiment of the present invention.

Next, a droplet discharge apparatus (hereinafter referred to as "discharge apparatus") 100 in accordance with this embodiment will be described. As shown in FIG. 3, the discharge apparatus 100 includes a tank 101 that holds a liquid material 111, and a discharge scanning component 102 to which the liquid material 111 is supplied from the tank 101 via a tube 110.

There are three types of the liquid material 111, for example, a material 111R, a material 111G and a material 111B. The material 111R constitutes the red layer 16R of the color filter 16 of the liquid crystal device 1 (hereinafter referred to as "red liquid material"). The material 111G constitutes the green layer 16G (hereinafter referred to as "green liquid material"). The material 111B constitutes the blue layer 16B (hereinafter referred to as "blue liquid material").

The tank 101 has a red material tank 101R for holding the red liquid material 111R, a green material tank 101G for holding the green liquid material 111G, and a blue material tank 101B for holding the blue liquid material 111B, and separately holds the above-mentioned three types of liquid material 111 (111R, 111G, and 111B). A pressure pump (not shown), for example, is attached to each of the tanks 101 (101R, 101G, and 101B). This pressure pump is driven to apply pressure inside the tank 101, which causes the liquid material 111 to be supplied from inside the tank 101 to the discharge scanning component 102.

A solution obtained by dispersing a red inorganic pigment (such as red iron(III) oxide or cadmium red) in a polyurethane oligomer, then adding butylcarbitol acetate as a solvent, adding a nonionic surfactant as a dispersant, and adjusting the viscosity to within the required range, is used as the red liquid material 111R here, for example.

A solution obtained by dispersing a green inorganic pigment (such as chromium oxide green or cobalt green) in a polyurethane oligomer, then adding cyclohexane and butyl acetate as solvents, adding a nonionic surfactant as a dispersant, and adjusting the viscosity to within the required range, is used as the green liquid material 111G here, for example.

A solution obtained by dispersing a blue inorganic pigment (such as ultramarine or Prussian blue) in a polyurethane oligomer, then adding butylcarbitol acetate as a solvent, adding a nonionic surfactant as a dispersant, and adjusting the viscosity to within the required range, is used as the blue liquid material 111B here, for example.

The discharge scanning component 102 has a carriage 103 for holding a plurality of heads 114 (see FIG. 4), a carriage position control device 104 for controlling the position of the carriage 103, a stage 106 for holding a base 10A that constitutes a color filter-side motherboard, a stage position control device 108 for controlling the position of the stage 106, and a controller 112. In actual practice, a plurality of (such as 10) carriages 103 are installed in the discharge apparatus 100. In FIG. 3, however, just one carriage 103 is shown in order to simplify the description.

The carriage position control device 104 is designed to move the carriage 103 in the X or Z axis direction according to signals from the controller 112. The stage position control device 108 is designed to move the stage 106 in the Y axis direction according to signals from the controller 112.

As discussed above, the carriage 103 is designed to move in the X axis direction under the control of the carriage position control device 104. The stage 106, meanwhile, is designed to move in the Y axis direction under the control of the stage position control device 108. In other words, the relative positions of the heads 114 with respect to the stage 106 are varied by the carriage position control device 104 and the stage position control device 108.

Thus, the carriage 103 can be made to scan the stage 106 (or the base 10A held on the stage 106) by moving either the carriage 103 or the stage 106, or both. In this embodiment, a case will be described in which the carriage 103 is held still and scanning is performed by moving the stage 106.

Figure 4:
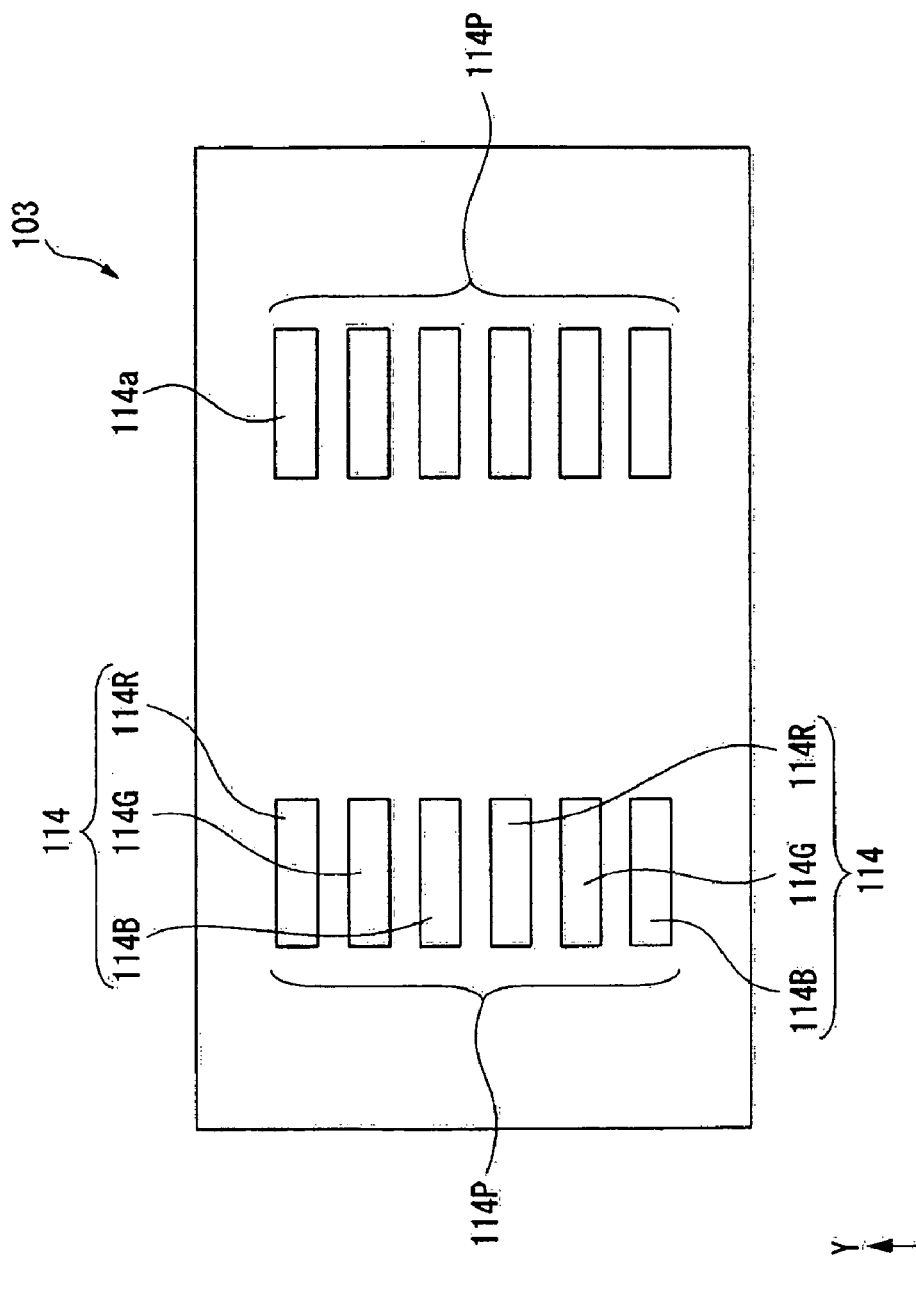
FIG. 4 is a plan view of a structure of a carriage of the droplet discharge apparatus in accordance with the first embodiment of the present invention.

FIG. 4 is a plan view of one carriage 103 from the stage 106 side, and the direction perpendicular to the viewing plane in FIG. 4 is the Z axis direction. The left and right direction in the viewing plane of FIG. 4 is the X axis direction, and the up and down direction is the Y axis direction.

As shown in FIG. 4, the carriage 103 holds a plurality of heads 114 each having substantially the same structure. There are three types of heads 114, that is, a head 114R for discharging the red liquid material 111R out of the liquid material 111, a head 114G for discharging the green liquid material 111G out of the liquid material 111, and a head 114B for discharging the blue liquid material 111B out of the liquid material 111.

A head group 114P is provided at two places on the carriage 103. Each head group 114P is provided with two heads 114R, two heads 114G, and two heads 114B, which are provided in a row in the Y axis direction. Therefore, a single carriage 103 is provided with four heads 114R, four heads 114G, and four heads 114B, so a total of 12 heads 114 are provided.

Figure 5:
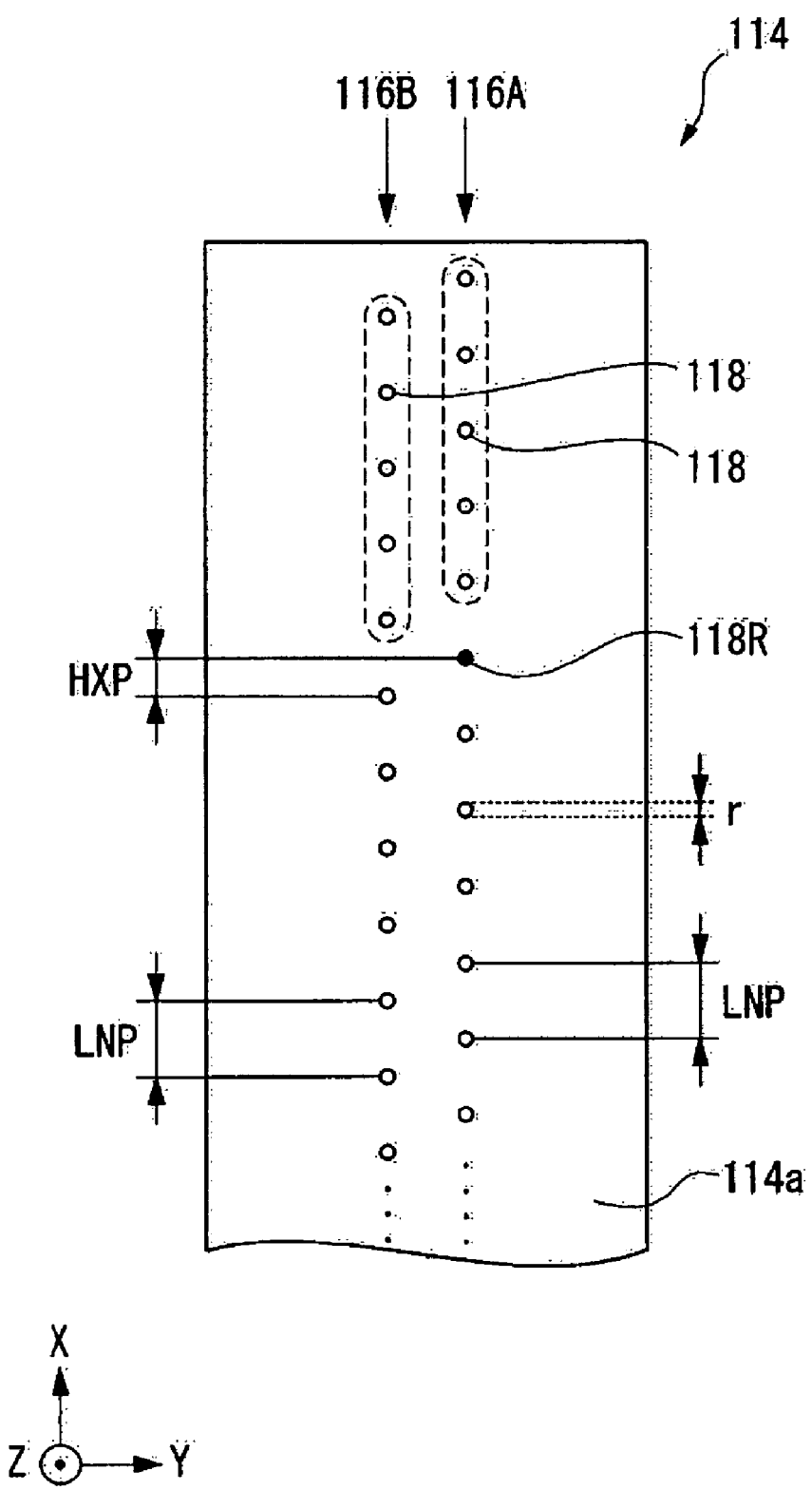
FIG. 5 is a partial plan view of an external structure of a head of the droplet discharge apparatus in accordance with the first embodiment of the present invention.

FIG. 5 is a diagram of the bottom surface 114a of a head 114. The shape of the bottom surface 114a is rectangular, having two opposing long sides and two opposing short sides. This bottom surface 114a faces the stage 106 side (in the Z axis direction in the drawing). The long side direction of the head 114 is parallel to the X axis direction in the drawing, and the short side direction of the head 114 is parallel to the Y axis direction in the drawing.

Ninety (for example) nozzles 118 are disposed in two rows (nozzle row 116A and nozzle row 116B) on the bottom surface 114a. The diameter of the nozzles 118 is approximately 30 μm. The nozzles 118 on the nozzle row 116A side and the nozzles 118 on the nozzle row 116B side are disposed at a specific nozzle pitch LNP (LNP is approximately 140 μm) in each row.

The nozzles 118 of the nozzle row 116B are disposed such that they are offset to the positions of the nozzles 118 of the nozzle row 116A by half the length of the nozzle pitch LNP (approximately 70 μm) in the negative direction of the X axis direction (downward in FIG. 5). There need not be two rows of nozzles provided to the head 114. For instance, the number of rows may be increased to three rows, four rows, . . . M rows (where M is a natural number), or there may be only one row.

Since the nozzle row 116A and the nozzle row 116B are each made up of 90 nozzles, 180 nozzles are provided to a single head 114. However, the nozzles up to the fifth one from each end of the nozzle row 116A do not discharge the liquid material 111 (idle nozzles; the portions surrounded with the dashed lines in FIG. 5).

Similarly, the nozzles up to the fifth one from each end of the nozzle row 116B are also idle nozzles that do not discharge liquid material 111 (the portions surrounded with the dashed lines in FIG. 5). Accordingly, only 160 of the 180 nozzles 118 in each head 114 are designed to discharge the liquid material 111 (discharge nozzles), and the 20 nozzles 118 at the ends do not.

In this embodiment of the present invention, of the 90 nozzles 118 included in the nozzle row 116A, the sixth nozzle 118 from the upper end in the drawing is labeled the "reference nozzle 118R" of the head 114. That is, of the 80 discharge nozzles in the nozzle row 116A, the uppermost discharge nozzle in the drawing is called the "reference nozzle 118R" of the head 114. The position of the reference nozzle 118R need not be the one given above, as long as the reference nozzle 118R is designated in the same way for all of the heads 114.

The structure of the interior of the head 114 will now be described. As shown in FIGS. 6A and 6B, the heads 114 are inkjet heads. More specifically, the heads 114 are each equipped with a diaphragm 126 and a nozzle plate 128. A reservoir 129 that is always filled with the liquid material 111 supplied from the tank 101 through a hole 131 is provided between the diaphragm 126 and the nozzle plate 128.

A plurality of dividing walls 122 are also provided between the diaphragm 126 and the nozzle plate 128. The portion bounded by the diaphragm 126, the nozzle plate 128, and a pair of dividing walls 122 is a cavity 120. A cavity 120 is provided for every nozzle 118, and the number of cavities 120 is the same as the number of nozzles 118. The liquid material 111 is supplied from the reservoir 129, through a supply port 130 provided between a pair of dividing walls 122, to each of the cavities 120.

Oscillators 124 are provided on the diaphragm 126 at positions corresponding to the cavities 120. The oscillators 124 each have a piezo element 124C and a pair of electrodes 124A and 124B that sandwich the piezo element 124C. The liquid material 111 is discharged from the corresponding nozzles 118 by applying drive voltage between the pairs of electrodes 124A and 124B. The shape of the nozzles 118 is adjusted so that liquid material will be discharged in the Z axis direction from the nozzles 118. Electro-thermal conversion elements may be used instead of piezo elements. In other words, the structure may be such that the liquid material 111 is discharged by utilizing the thermal expansion of the material produced by thermal conversion elements.

Figure 7:
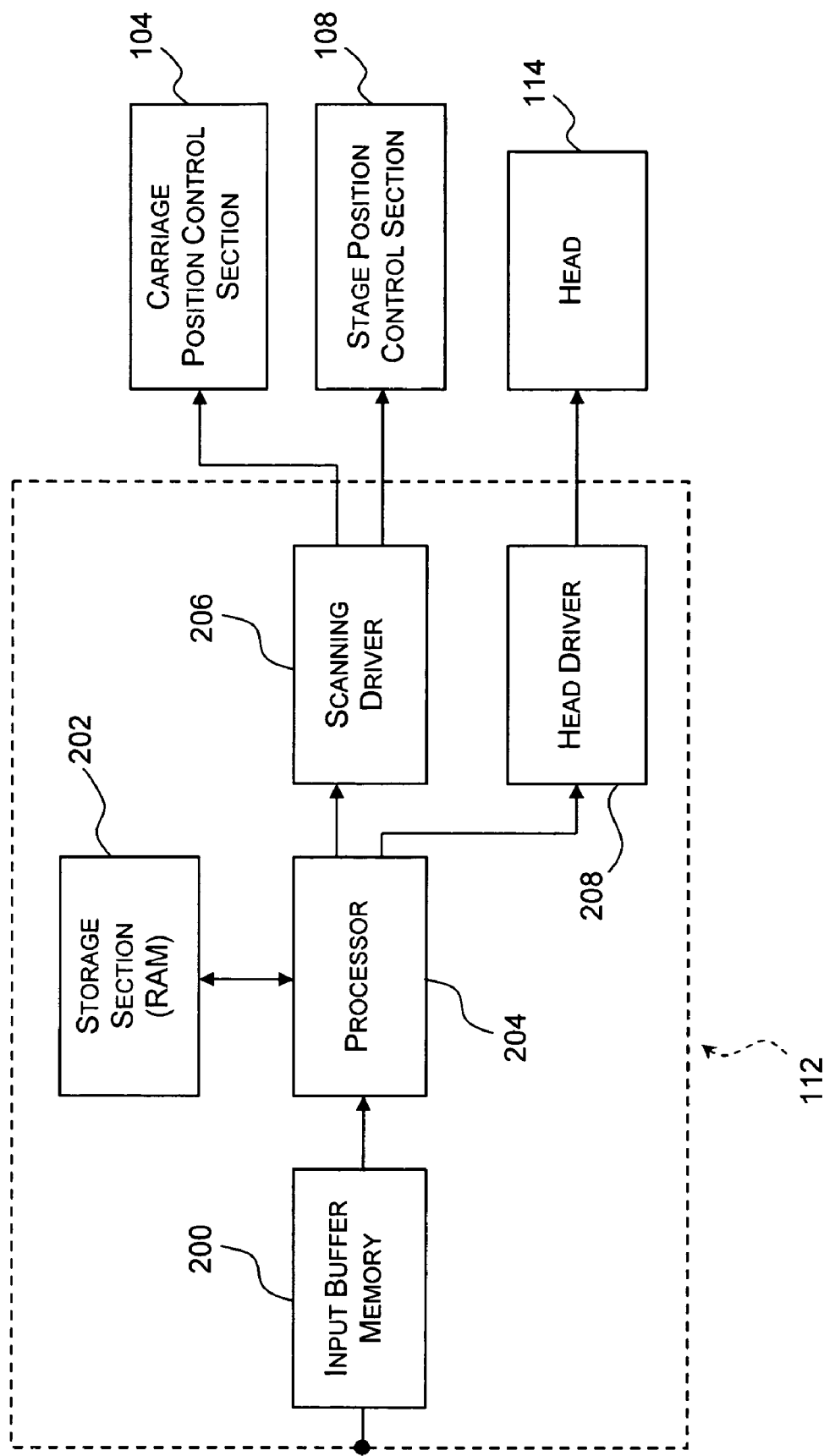
FIG. 7 is a block diagram of a structure of a controller of the droplet discharge apparatus in accordance with the first embodiment of the present invention.

The structure of the controller 112 will now be described. FIG. 7 is a block diagram illustrating the structure of the controller 112.

The controller 112 is configured to perform overall control related to the operation of the discharge apparatus 100, such as the timing at which the liquid material 111 is discharged, the position where the carriage 103 is fixed, the movement of the stage 106 (its movement speed, movement distance, etc.), and so forth.

As shown in FIG. 7, the controller 112 is equipped with an input buffer memory 201, a storage section 202, a processing section or processor 204, a scanning driver 206, and a head driver 208. The various components are communicably connected.

The input buffer memory 201 receives discharge data for performing the discharge of droplets of the liquid material 111 from an externally connected information processor, for example. The input buffer memory 201 supplies discharge data to the processor 204, and the processor 204 stores the discharge data in the storage section 202. A RAM or the like is used as the storage section 202.

The processor 204 accesses the discharge data stored in the storage section 202, and supplies the necessary drive signal to the scanning driver 206 and the head driver 208 on the basis of this discharge data.

The scanning driver 206 supplies a specific control signal to the carriage position control device 104 and the stage position control device 108 on the basis of this drive signal. The head driver 208 supplies the heads 114 with discharge signals for discharging the liquid material 111 on the basis of the drive signal.

As shown in FIG. 8A, the head driver 208 has one drive signal generator 203 and a plurality of analog switches AS. The analog switches AS are connected to the oscillators 124 inside the heads 114 (more specifically, they are connected to the electrodes 124A, although the electrodes 124A are not shown in FIG. 8A). These analog switches AS are provided corresponding to the nozzles 118, and the number of nozzles 118 is the same as the number of analog switches AS.

The drive signal generator 203 generates a drive signal DS as shown in FIG. 8B. The drive signals DS are supplied independently to the input terminals of the various analog switches AS. The potential of a drive signal DS varies over time versus the reference voltage V. Specifically, the drive signal DS is a signal in which a plurality of discharge waveforms P are repeated at a discharge period EP. The discharge period EP is adjusted to the desired value by the processor 204, for example. Suitably adjusting this discharge period EP allows a discharge signal to be generated so that the liquid material 111 is discharged in the specified order from the plurality of nozzles 118. This allows the timing of the discharge to be controlled.

The controller 112 can also control the volume of liquid material 111 discharged from the nozzles 118. This control of the volume of liquid material 111 is designed to allow the nozzles 118 to be controlled individually. The volume of liquid material 111 discharged from each nozzle 118 is variable between 0 and 42 pL (picoliters).

The controller 112 may also be a computer that includes a CPU, ROM, and RAM. In this case, the above-mentioned functions of the controller 112 are handled by a software program executed by the computer. The controller 112 may consist of a dedicated circuit (hardware).

Method for Manufacturing Liquid Crystal Device

Droplet Discharge Method

The steps for manufacturing the liquid crystal device 1 constituted as above will now be described. This embodiment will be described using as an example a method in which a plurality of liquid crystal devices are formed all at once using a motherboard with a large surface area, and these are then cut apart into individual liquid crystal devices 1.

First, the step of forming the color filter-side motherboard will be described briefly. The base 10A is held on the stage 106. Prescribed portions 18 (18R, 18G, and 18B; see FIG. 9, etc.) that hold the various layers of a color filter are formed on this base 10A. A red layer 16R is held in the prescribed portions 18R, a green layer 16G is held in the prescribed portions 18G, and a blue layer 16B is held in the prescribed portions 18B. When the base 10A is placed on the stage 106, its position is adjusted so that the short side direction of the base 10A coincides with the X axis direction, and the long side direction coincides with the Y axis direction.

In this state, the stage 106 is moved from the left (in the drawing) to the right as shown in FIG. 9. The carriage 103 scans over the base 10A in the opposite direction, that is, from right to left (in the drawing). At this time, droplets of liquid material 111 are discharged from the heads 114 over each of the prescribed portions 18 while the carriage 103 scans over the base 10A.

For instance, on this scan, as shown in FIG. 9, droplets of a red liquid material $111R_1$, a green liquid material $111G_1$, and a blue liquid material $111B_1$ are discharged to the prescribed portions 18 in the uppermost row in the drawing. The droplets of the liquid material 111 ($111R_1$, $111G_1$, and $111B_1$) may be discharged to any of the rows of the prescribed portions 18, which are provided in a plurality of rows, as desired.

Figure 10:
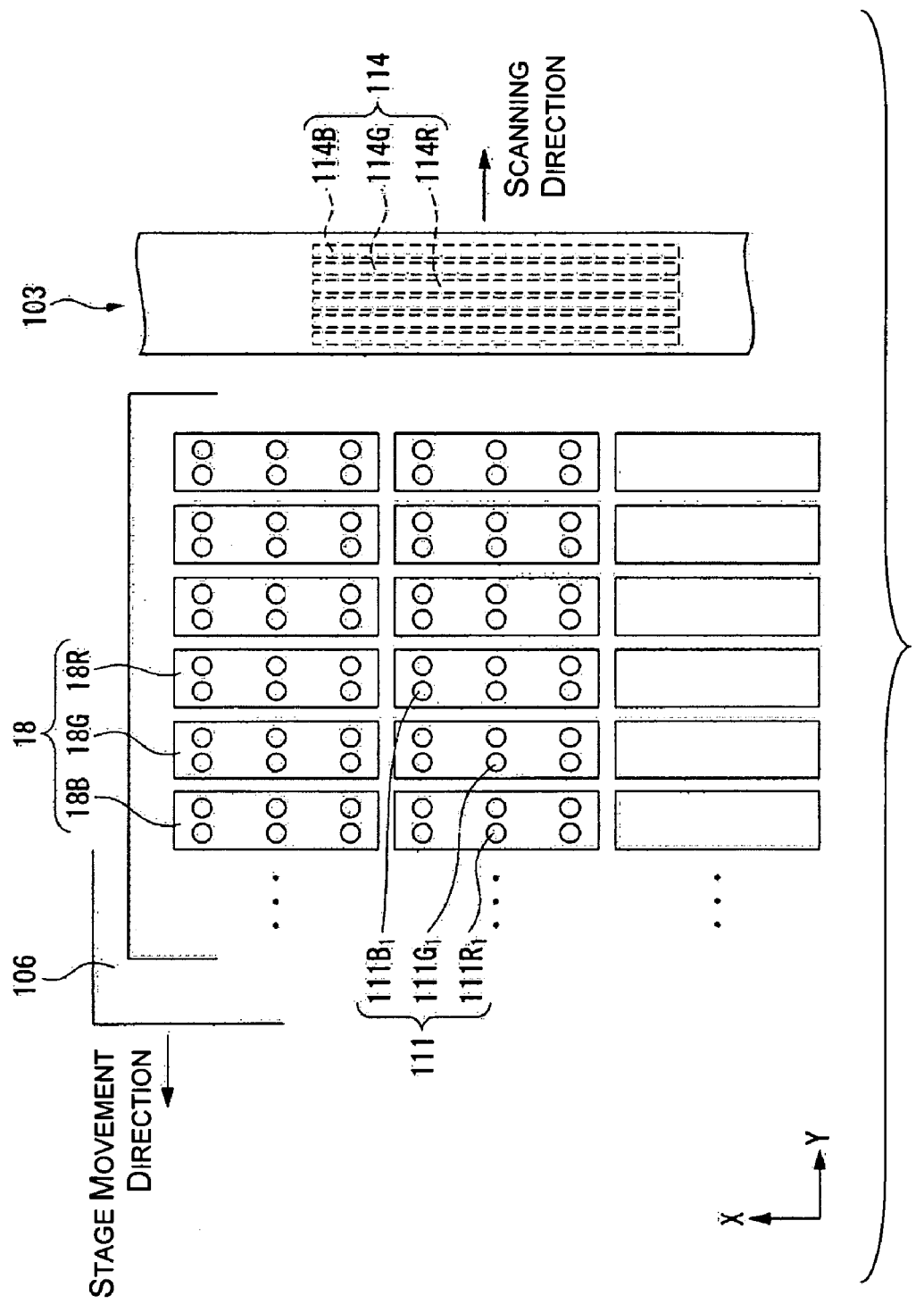
FIG. 10 is a diagram of a first part of the droplet discharge method in accordance with the first embodiment of the present invention.

Next, as shown in FIG. 10, the stage 106 is moved from right to left (in the drawing). The carriage 103 scans over the base 10A in the opposite direction from that of the first scan, that is, from left to right (in the drawing). At this point, droplets of the liquid material 111 are discharged from the heads 114 while the carriage 103 scans the base 10A.

In this scanning, droplets of liquid material 111 are discharged to the prescribed portions 18 to which no liquid material 111 has yet been discharged. For example, as shown in FIG. 10, droplets of the red liquid material $111R_1$, the green liquid material $111G_1$, and the blue liquid material $111B_1$ are discharged to the prescribed portions 18 in the second row from the top in the drawing, to which no liquid material 111 was discharged in the first scan. Droplets of liquid material 111 ($111R_1$, $111G_1$, and $111B_1$) are discharged while selecting those prescribed portions 18 to which no liquid material 111 has been discharged, from among the prescribed portions 18 provided in a plurality of rows, and scanning is repeated until the liquid material 111 has been discharged into each of the prescribed portions 18 one time.

In the above scanning, the liquid material 111 has only been discharged to part of each of the prescribed portions 18, and the volume of the liquid material 111 is insufficient to form the red layer 16R, green layer 16G, and blue layer 16B of the color filter 16. Accordingly, in subsequent scanning, additional discharge of the liquid material 111 is performed, enough for the prescribed portions 18.

The positions (landing positions) on the prescribed portions 18, wherein the liquid material 111 discharged from the heads 114 lands, will now be described through reference to FIG. 11. FIG. 11 is a diagram of the landing positions of the liquid material 111. Landing positions 200R, 200G, and 200B each are arranged in two columns and three rows, for example, on the prescribed portions 18R, 18G, and 18B. The liquid material 111 is discharged from the heads 114 so that it will always land at the positions of these landing positions 200 for a single prescribed portion 18, regardless of whether it is the first, second, . . . , or n-th discharge. Therefore, in subsequent scanning, new liquid material 111 is discharged over the liquid material 111 discharged the first time.

Figure 12:
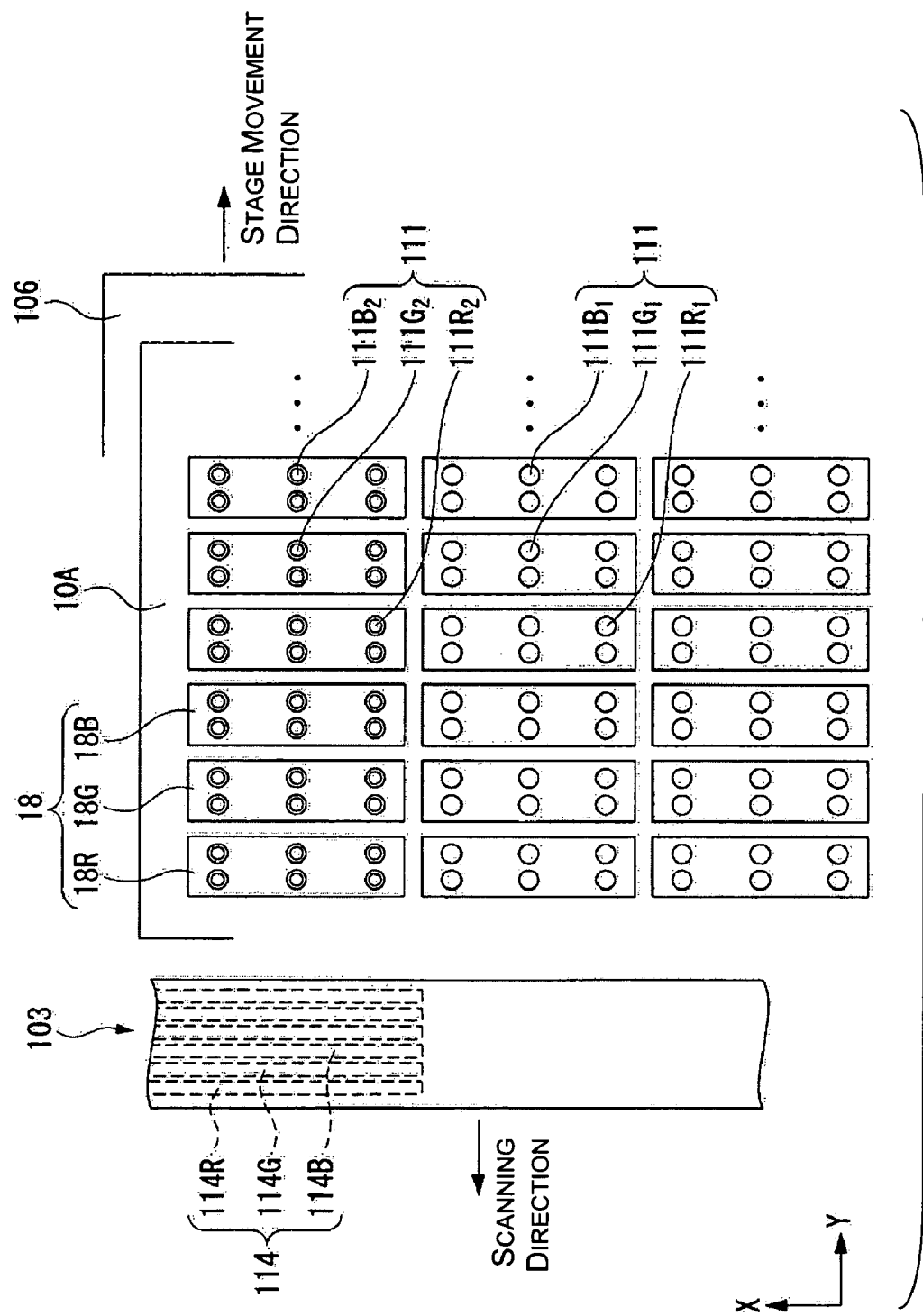
FIG. 12 is a diagram of a second part of the droplet discharge method in accordance with the first embodiment of the present invention.

Based on this, the second and subsequent discharge scans in the prescribed portions 18 (18R, 18G, and 18B) will be described in more detail. As shown in FIG. 12, the liquid material 111 is discharged while the stage 106 is moved from left to right (in the drawing) and the carriage 103 is scanned from right to left (in the drawing) over the base 10A. The liquid material 111 lands in the same positions as in the first discharge. Specifically, droplets of red liquid material $111R_2$ land on the droplets of red liquid material $111R_1$, in each of the prescribed portions 18 in the uppermost row in the drawing, droplets of green liquid material $111G_2$ land over the droplets of green liquid material $111G_1$, and droplets of blue liquid material $111B_2$ land over the droplets of green liquid material $111G_1$. Then, the same operation is repeated in scans of the second, third, and subsequent stages from the top in the drawing, and this operation is repeated until enough liquid material 111 has been discharged to the prescribed portions 18.

The subsequent steps will now be described briefly. Electrodes, wiring, and so forth (not shown) are formed on the base 10A on which the color filter 16 was formed, and a smoothing film is formed. A dividing wall or spacer (not shown) for gap control is formed on the surface of the base 10A. An oriented film is formed so as to cover the color filter or wiring formed on this base 10A, and this oriented film is lapped. The oriented film can be formed, for example, by coating or printing with a polyimide. A sealing material composed of an epoxy resin or the like is formed in a rectangular shape, and the region surrounded by the sealing material is coated with liquid crystals.

Next, in the formation of the motherboard on the active matrix side, wiring, electrodes, and so forth are formed on a large substrate composed of a transparent material such as glass or plastic, and a smoothing film is formed on the region where the wiring, electrodes, and so forth have been formed. Once the smoothing film is formed, an oriented film composed of polyimide or the like is formed, and this oriented film is lapped.

The motherboard on the color filter side and the motherboard on the active matrix side are then stuck together in the form of panels. With the two substrates close together, the motherboard on the active matrix side is bonded to the sealing material on the motherboard on the color filter side. After this, scribe lines are made on the bonded motherboards, the panels are cut along these scribe lines, the cut panels are washed, and drivers and so forth are mounted on the panels. A polarizer is affixed to the outer surface of each liquid crystal panel, and a backlight 41 is attached to complete the liquid crystal device 1.

Thus, with this embodiment, when droplets of the liquid material 111 are discharged to the prescribed portions 18 arranged in a matrix, droplets of the newly discharged liquid material 111 are made to land so as to avoid regions between adjacent landing positions 200 in the row direction (the Y direction in FIG. 11, for example) and the column direction (the X direction in FIG. 11, for example) of the matrix, out of the landing positions 200 of liquid material 111 that has already been discharged, so there is no need for fine adjustment in the landing of the liquid material so as to fill in between the landing positions 200, it becomes extremely easy to adjust the positions where the droplets of liquid material 111 land, and the formation of uneven films (the layers of the color filter 16) of the liquid material 111 can be prevented.

In this embodiment, in scanning, the newly discharged liquid material 111 is made to land at positions overlapping in a plan view with the landing positions 200 of the droplets of liquid material 111 that have already been discharged, and may be discharged at the same position every discharge, so it is easier to adjust the landing position of the droplets.

Second Embodiment

A second embodiment of the present invention will now be described. Just as in the first embodiment, in the drawings, the scale is varied as necessary to show each of the members large enough to be recognized. Those constituent elements that are the same as in the first embodiment are numbered the same and will not be described again. In this embodiment, the method for discharging the droplets of liquid material 111 is different from that in the first embodiment, so the description will center around this difference. In other words, the structure of the electro-optical device 1 and the droplet discharge apparatus 100 of the first embodiment illustrated in FIGS. 1-8B are applicable to the second embodiment. Further, this embodiment, just as was the first embodiment, will be described using as an example a method in which a plurality of liquid crystal devices are formed all at once using a motherboard with a large surface area, and these are then cut apart into individual liquid crystal devices 1.

Figure 13:
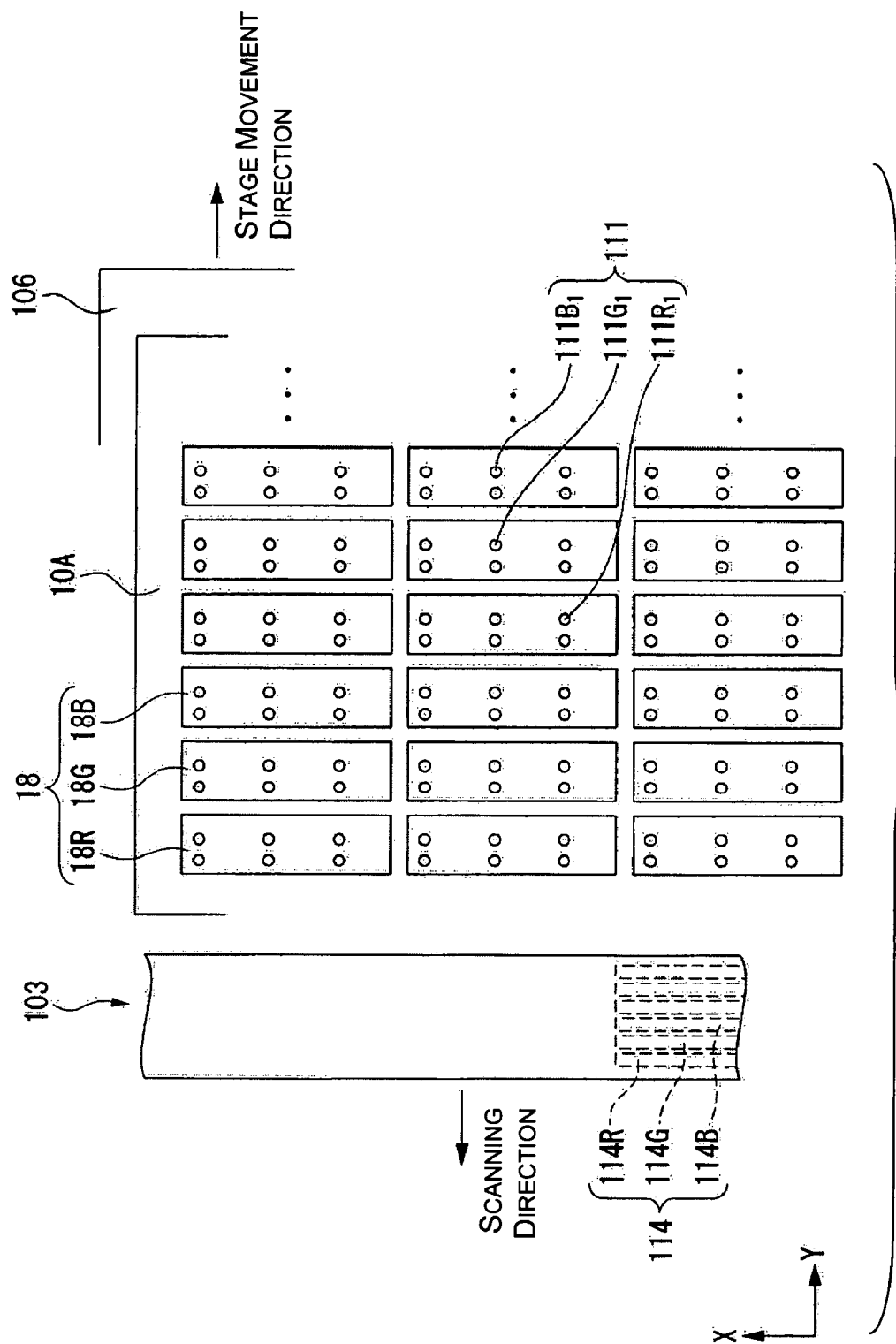
FIG. 13 is a diagram of a first part of a droplet discharge method in accordance with a second embodiment of the present invention.

By the same steps as in the first embodiment, the base 10A was held on the stage 106 of the discharge apparatus 100, and the positions are adjusted so that the short side direction of the base 10A coincides with the X axis direction, and the long side direction coincides with the Y axis direction. In this state, the heads 114 are scanned by the same method as in the first embodiment, and as shown in FIG. 13, the liquid material 111 (red liquid material $111R_1$, green liquid material $111G_1$, and blue liquid material $111B_1$) is discharged one time each in the prescribed portions 18.

Figure 14:
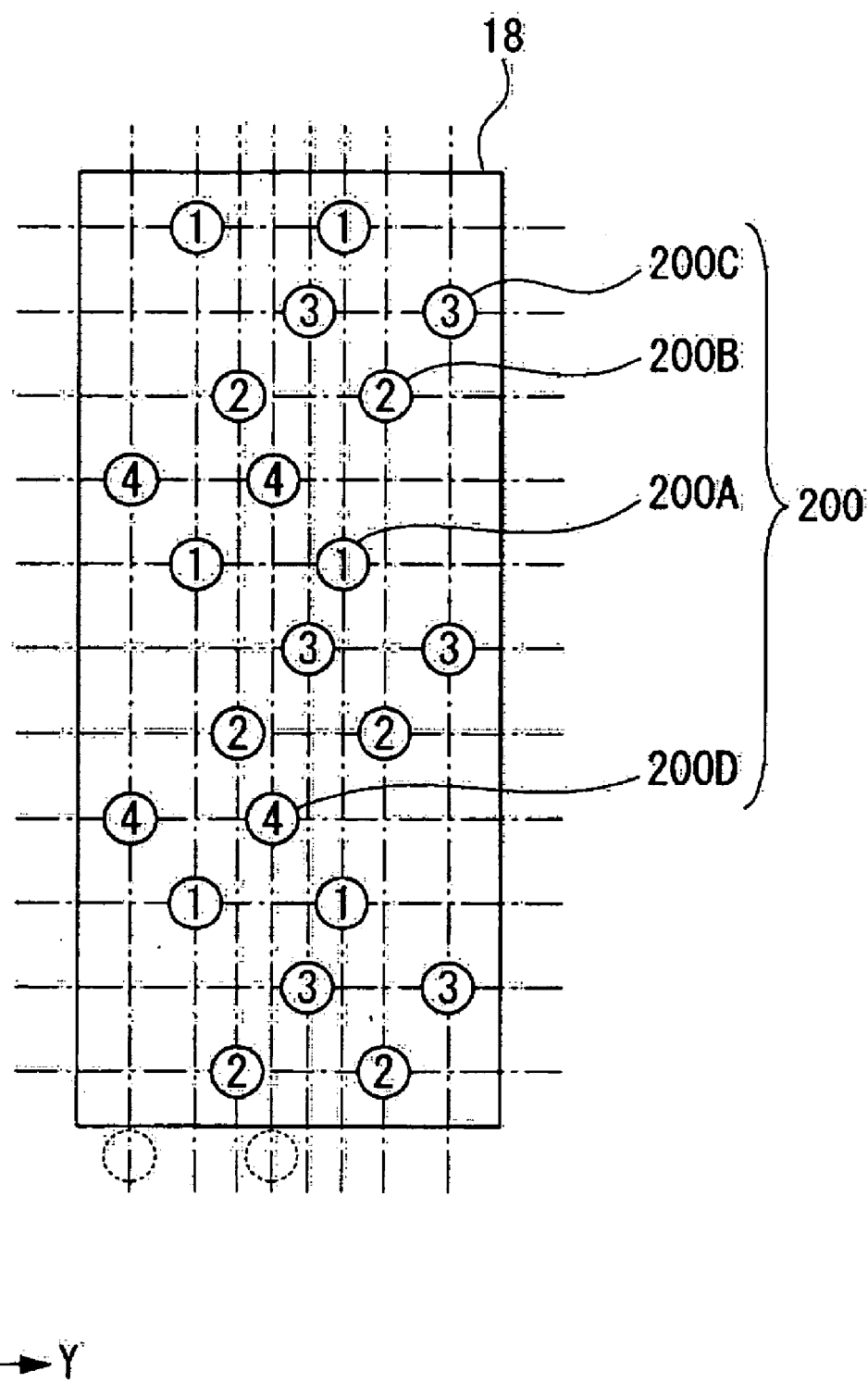
FIG. 14 is a partial enlarged view of the color filter substrate illustrating landing positions of the droplets on a prescribed portion of the color filter substrate in accordance with the second embodiment of the present invention.

The landing position of the liquid material 111 in this embodiment will now be described through reference to FIG. 14. FIG. 14 is a diagram of the positions on one of the prescribed portions 18 where the liquid material 111 lands after being discharged from the heads 114.

Landing positions 200 (landing positions 200A, landing positions 200B, landing positions 200C, and landing positions 200D), for example, are arranged in the prescribed portion 18. The landing positions 200 are arranged in two columns and three rows each, and are adjacent in the row direction (Y direction) and the column direction (X direction). To one prescribed portion 18, the heads 114 discharge the liquid material 111 so that it will land in the landing position 200A (i.e., circles with the reference number "1") the first time, in the landing position 200B (i.e., circles with the reference number "2") the second time, in the landing position 200C (i.e., circles with the reference number "3") the third time, and in the landing position 200D (i.e., circles with the reference number "4") the fourth time.

In disposing the landing positions 200, imaginary lines (indicated by one-dot chain lines in the drawing) in the X and Y directions are assumed to connect the centers of the landing positions 200A, the centers of the landing positions 200B, the centers of the landing positions 200C, and the centers of the landing positions 200D, and the landing positions 200A to 200D are laid out so that the centers of different landing positions avoid the straight lines, that is, at positions offset to straight lines drawn so that the centers of different prescribed portions do not overlap in straight lines. The phrase "different landing positions" here refers to landing positions other than the prescribed portions 200A when the landing positions 200A are used as a reference, for example. More specifically, the landing positions 200B, the landing positions 200C, and the landing positions 200D are the different landing positions. The same applies to the landing positions 200B, the landing positions 200C, and the landing positions 200D when these are used as the reference.

To describe FIG. 14 in more detail, the landing positions 200B are disposed offset downward (in the drawing) from a straight line in the X direction connecting the centers of the landing positions 200A, so as not to overlap this straight line. At the same time, they are disposed offset to the right (in the drawing) to a straight line in the Y direction so as not to overlap the straight line in the Y direction connecting the centers of the landing positions 200A.

The landing positions 200C are disposed offset downward (in the drawing) from the straight line of the landing positions 200A and upward (in the drawing) from the landing positions 200B, for example, so as not to overlap the straight lines in the X direction connecting the centers of the landing positions 200A and the centers of the landing positions 200B. At the same time, they are disposed offset to the right (in the drawing) from the straight lines of the landing positions 200A and the landing positions 200B, for example, so as not to overlap these straight lines in the Y direction.

The landing positions 200D are disposed offset to the left (in the drawing) from the straight lines of the landing positions 200A, the landing positions 200B, and the landing positions 200C, for example, so as not to overlap the straight lines in the Y direction connecting the centers of the landing positions 200A, the centers of the landing positions 200B, and the centers of the landing positions 200C. At the same time, they are disposed offset downward (in the drawing) from the straight lines of the landing positions 200A, the landing positions 200B, and the landing positions 200C, for example, so as not to overlap these straight lines in the Y direction.

Thus, the centers of different types of landing positions 200 are disposed offset to the straight lines connecting the centers of the landing positions 200 of the same type. The lowermost of the three rows (indicated by a broken line in the drawing) of the landing positions 200D may not be contained within the boundary of the prescribed portion 18. In this case, no droplets are allowed to land in the lowermost row of the landing positions 200D.

Figure 15:
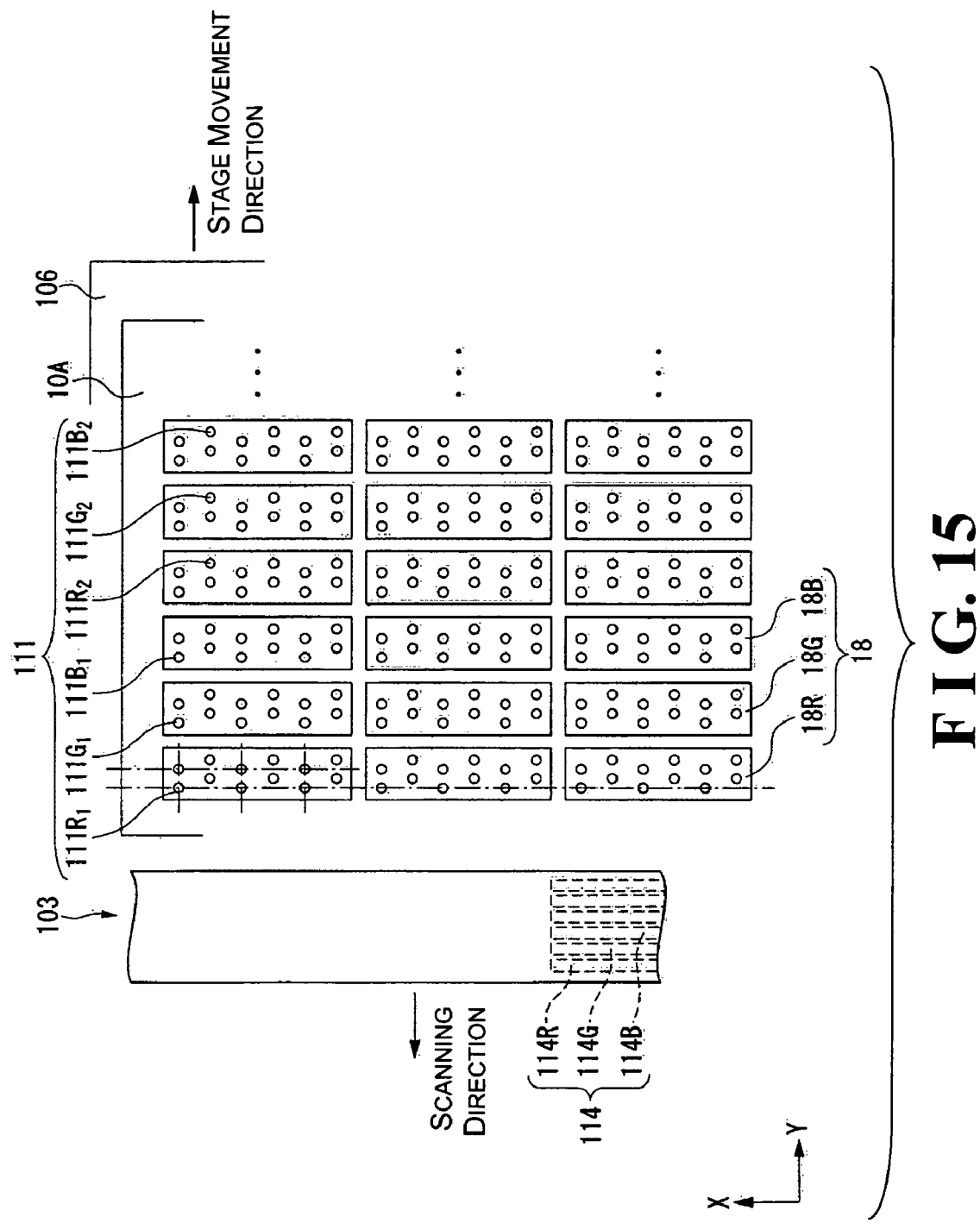
FIG. 15 is a diagram of a second part of the droplet discharge method in accordance with the second embodiment of the present invention.

Based on this, the scanning state shown in FIG. 13 is one in which droplets of the liquid material 111 have been discharged to the landing positions 200A of the prescribed portions 18. When the second discharge to the prescribed portions 18 is performed in this state, as shown in FIG. 15, droplets of the liquid material 111 (red liquid material $111R_2$, green liquid material $111G_2$, and blue liquid material $111B_2$) are discharged so as to land in the position of the landing positions 200B of the prescribed portions 18.

Although not depicted in the drawings, droplets of the liquid material 111 are discharged so as to land in the landing positions 200C of the prescribed portions 18 in the third discharge, and in the landing positions 200D in the fourth discharge. Thereafter, this scanning is repeated until enough liquid material 111 has been discharged to the prescribed portions 18. There is no problem here if the discharge overlaps the above-mentioned landing positions 200A to 200D.

The subsequent steps up to the completion of the liquid crystal device 1 by sticking together the motherboard on the color filter side and the motherboard on the active matrix side are the same as in the first embodiment, and will not be described again.

With this embodiment, in a plurality of discharges, droplets of the liquid material 111 are made to land so that the landing positions 200 will be adjacent in the X direction and/or the Y direction in FIG. 14, for example, and new droplets of liquid material 111 are made to land at positions offset from the straight lines connecting the centers of these landing positions 200, so it is possible for the droplets of liquid material 111 to be landed over the entire prescribed portions 18. As a result, the liquid material 111 (red liquid material 111R, green liquid material 111G, and blue liquid material 111B) can be formed smoothly in the prescribed portions 18.

Electronic Device

Next, the electronic device in accordance with the present invention will be described, using a mobile telephone as an example.

Figure 16:
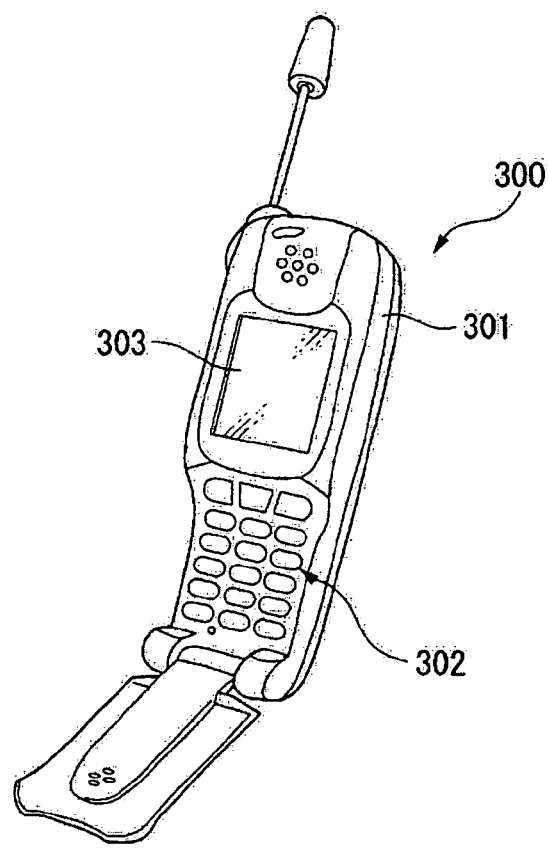
FIG. 16 is a perspective view of an electronic device in accordance with the present invention.

FIG. 16 is a perspective view of the overall structure of a mobile telephone 300.

The mobile telephone 300 has a housing 301, a control pad 302 provided with a plurality of control buttons, and a display component 303 for displaying still or moving images, text, or the like. The liquid crystal device 1 in accordance with the present invention is installed in the display component 303.

With this liquid crystal device 1, because droplets of a functional liquid are formed by a droplet discharge method in which, as discussed above, the positions where the droplets of liquid material 111 land can be easily adjusted, and the formation of a non-uniform film of liquid material 111 can be prevented, there is better display consistency and the quality is higher. Because the liquid crystal device 1 is installed, the mobile telephone 300 has superior display performance.

The technological scope of the present invention is not limited to the above embodiments, and modifications can be made as desired to the extent that the gist of the present invention is not exceeded.

For instance, forming the color filter 16 on the color filter substrate 3 of the liquid crystal device 1 was given above as an example of the present invention, but the present invention is not limited to this, and can also be applied to the formation of an organic layer (such as a light emitting layer) on a substrate for an organic EL device.

Figure 17:
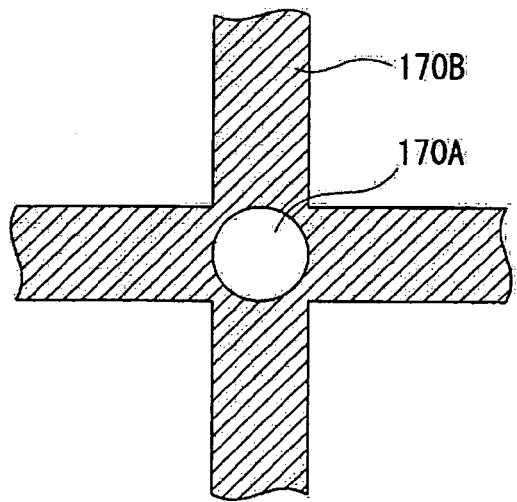
FIG. 17 is a diagram illustrating a landing position and their surrounding region.

The landing positions of the newly discharged liquid material are not limited to the positions explained in the first and second embodiments above. For example, the newly discharged liquid material may be made to land so as to avoid regions extending linearly in the row direction and in the column direction of the matrix from the landing positions of the droplets already discharged to the prescribed portions. The phrase "regions extending linearly in the row direction and in the column direction of the matrix from the landing positions of the droplets already discharged to the prescribed portions" as used herein will be described through reference to FIG. 17, for example. In FIG. 17, a circular portion 170A indicates one of the "landing positions of the droplets already discharged," and a hatched portion 170B indicates the "regions extending linearly in the row direction and in the column direction of the matrix from the landing positions." As shown in FIG. 17, the "regions extending linearly in the row direction and in the column direction of the matrix from the landing positions" is not considered to include the landing position 170A itself.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a droplet discharge apparatus, an electro-optical device or an electronic device equipped with the present invention. Accordingly, these terms, as utilized to describe the present invention should be interpreted relative to a droplet discharge apparatus, an electro-optical device or an electronic device equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A droplet discharge method comprising:

performing at least first, second and third scans in which a discharge head and a substrate are scanned relative to each other;

discharging a plurality of first droplets of functional liquid from the discharge head onto a plurality of prescribed portions on the substrate that are arranged in a matrix during the first scan;

discharging a plurality of second droplets of the functional liquid from the discharge head onto the prescribed portions during the second scan so that the second droplets are made to land such that centers of the second droplets are offset from straight lines connecting centers of landing positions of the first droplets in a row direction of the matrix and extended in the row direction and from straight lines connecting the centers of the landing positions of the first droplets in a column direction of the matrix and extended in the column direction; and discharging a plurality of third droplets of the functional liquid from the discharge head onto the prescribed portions during the third scan so that the third droplets are made to land such that centers of the third droplets are offset from straight lines connecting centers of landing positions of the second droplets in the row direction of the matrix and extended in the row direction, from straight lines connecting the centers of the landing positions of the second droplets in the column direction of the matrix and extended in the column direction, from the straight lines connecting centers of landing positions of the first droplets in the row direction of the matrix and extended in the row direction and from the straight lines connecting the centers of the landing positions of the first droplets in the column direction of the matrix and extended in the column direction.

2. The droplet discharge method as recited in claim 1, wherein the performing of the first, second and third scans includes moving the discharge head and the substrate relative to each other in a direction substantially perpendicular to a nozzle row of the discharge head in each of the first, second and third scans.

* * * * *